United States Patent Office 2,810,083
Patented Oct. 15, 1957

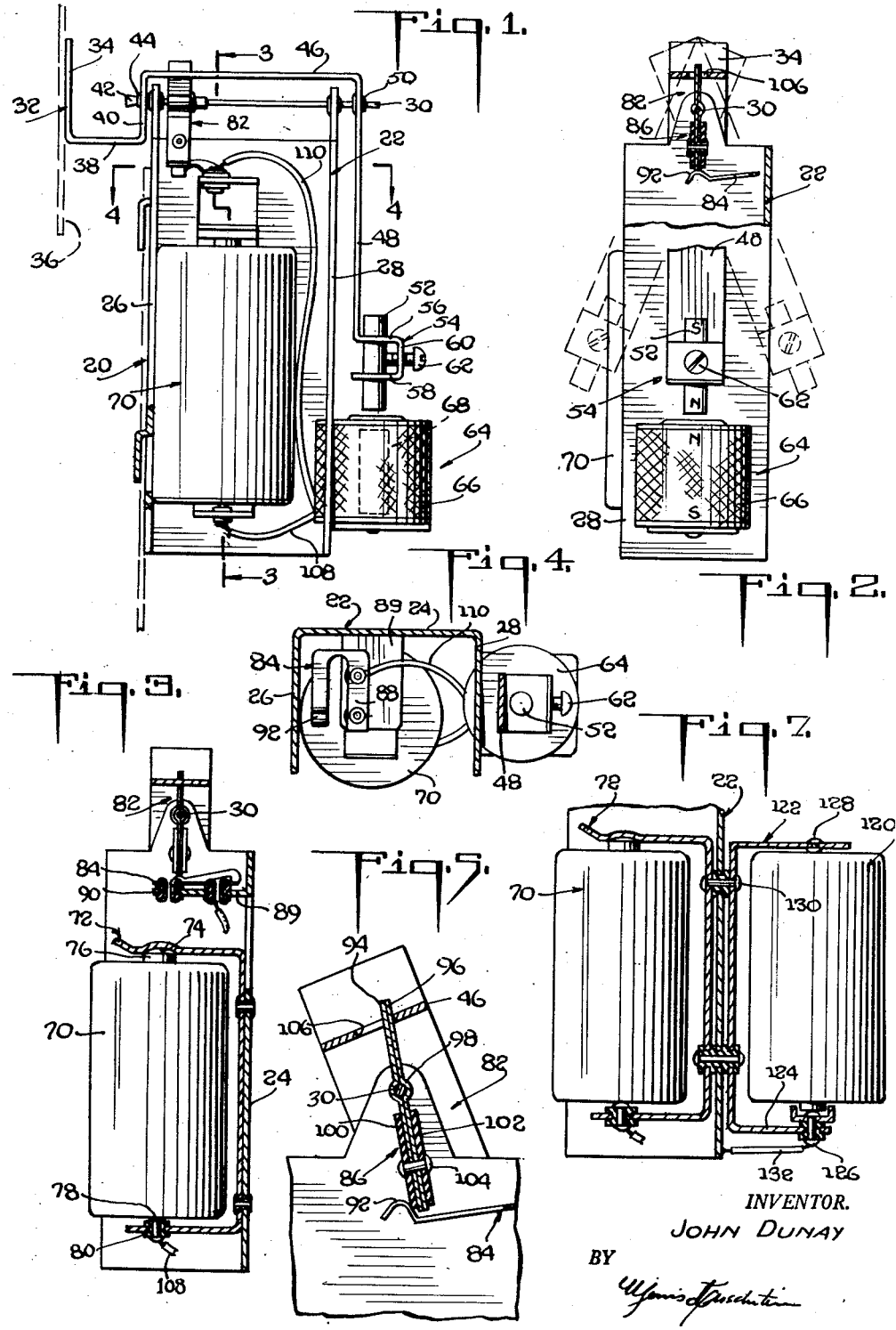

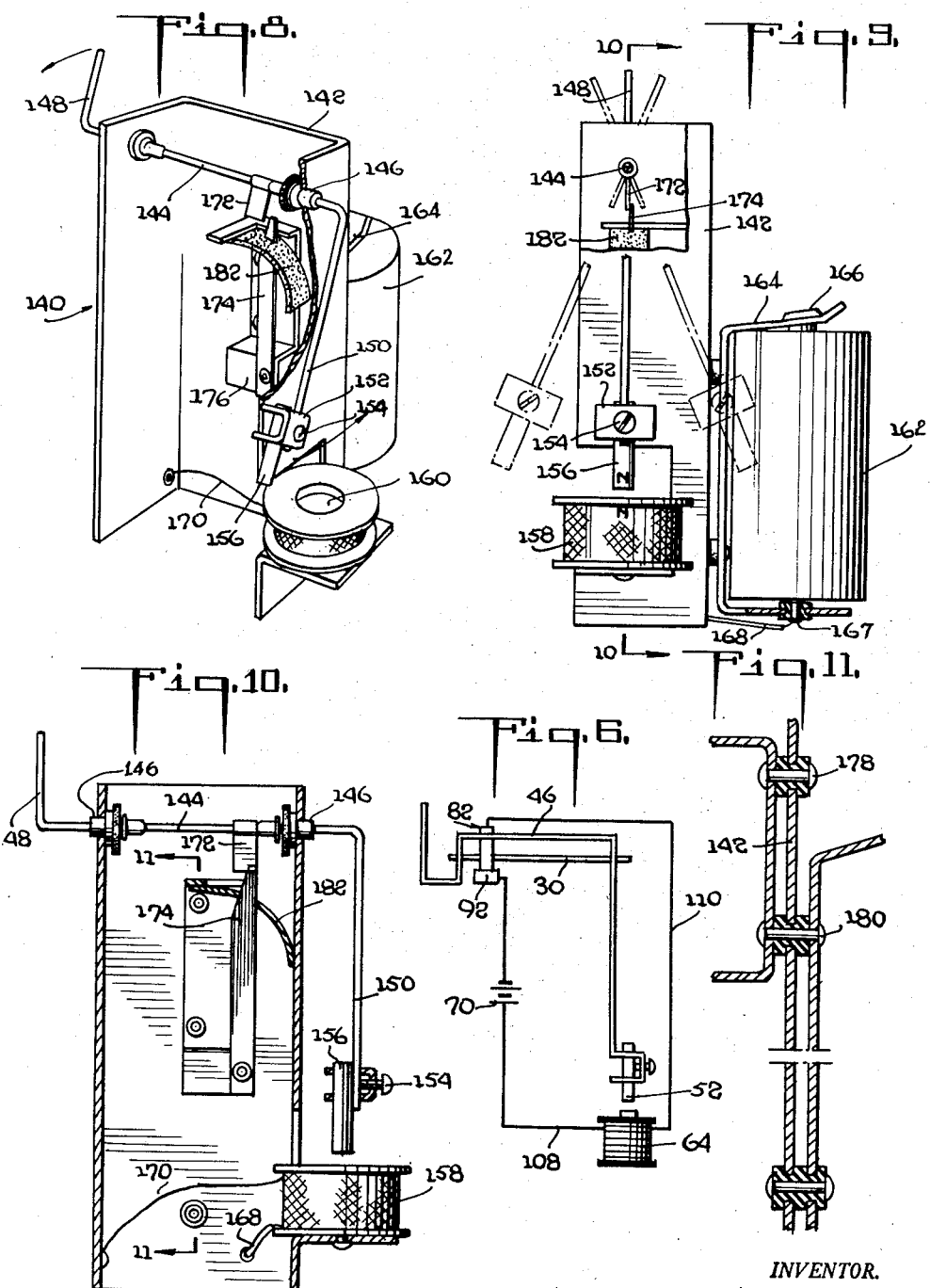

2,810,083

ELECTROMAGNETIC OSCILLATING MOTORS

John Dunay, New Milford, N. J., assignor to Haft and Sons, Inc., Brooklyn, N. Y., a corporation of New York Application August 31, 1953, Serial No. 377,640

6 Claims. (Cl. 310—39)

This invention relates to electromagnetic motors.

More specifically, my invention pertains to a motor of the character described whose primary motion is oscillatory rather than rotary and which is particularly designed to be employed in the operation of an animated display device or the like.

In general, it is the object of my invention to provide a motor of the character described which is small, light, compact, inexpensive and durable, and which will operate over extended periods of time from the electrical energy of a small battery, such as a flashlight battery, whereby the motor requires very little attention.

It is another object of my invention to provide a motor of the character described in which a powerful impetus is given to a pendulum by repulsion very shortly after the pendulum has swung past dead-center position whereby a positive and forceful thrust can be imparted with a minimum expenditure of energy.

It is another object of my invention to provide a motor of the character described whose construction is such that extremely short periods of intermittent energization are required for operation in order thereby to extend the useful life of the battery which is employed to energize the motor.

It is anohter object of my invention to provide a motor of the character described which will not draw current when it is not running even if the battery remains connected so that if the motor should be stopped inadvertently the battery will not be drained.

It is another object of my invention to provide a motor of the character described which can be stopped without removing the battery and without operating a manually operable switch.

It is another object of my invention to provide a motor of the character described whose period of oscillation can be regulated easily so as to enable the motor to be used for a wide variety of purposes.

It is another object of my invention to provide a motor of the character described having provision for internally accommodating the battery in order to reduce the size and increase the stability of the motor.

It is another object of my invention to provide a motor of the character described having a novel switch means for shortening the duration of the make-and-break contact time for the electromagnet.

It is another object of my invention to provide a motor of the character described which constitutes relatively few and simple parts and is of sturdy construction.

Other objects of my invention in part will be obvious and in part will be pointed out hereinafter.

My invention accordingly consists in the features of construction, combinations of elements and arrangements of parts which will be exemplified in the motors hereinafter described and illustrated and of which the scope of application will be indicated in the appended claims.

In the accompanying drawings, in which are shown various possible embodiments of my invention, Fig. 1 is a side view of a motor constructed in accordance with my invention;

Fig. 2 is a front view thereof with certain portions of the motor broken away in order better to illustrate the contacts for intermittently energizing the electromagnet;

Figs. 3 and 4 are sectional views taken substantially along the lines 3—3 and 4—4, respectively, of Fig. 1;

Fig. 5 is an enlarged vertical sectional view through the contacts, the same being illustrated in the position they occupy at one extreme position of the pendulum;

Fig. 6 is a schematic electrical diagram of the motor circuit;

Fig. 7 is a view similar to Fig. 3 of a modified form of my invention;

Fig. 8 is a perspective view of a motor embodying another modified form of my invention;

Fig. 9 is a rear view of the motor shown in Fig. 8;

Fig. 10 is a sectional view taken substantially along the line 10—10 of Fig. 9; and Fig. 11 is an enlarged sectional view taken substantially along the line 11—11 of Fig. 10.

Referring now in detail to the drawings, and more particularly to Figs. 1 through 5, the reference numeral 20 denotes one embodiment of a motor constructed in accordance with my invention. Said motor constitutes a suitable inexpensive frame as, for example, a channel-shaped sheet metal member 22. Said member includes a side wall 24, a front wall 26 and a rear wall 28. The front and rear walls are pierced in registry near their upper ends to support a fixed horizontal shaft 30 that serves to rotatably mount an S-shaped strip 32.

Said strip includes a vertical reach 34 which is adapted to be connected to a movable element of a display such, for example, as a panel 36. The lower end of the reach 34 is joined to a horizontal spacing reach 38 that is located at a lower level than the shaft 30. Said reach 38 is connected to an intermediate vertical reach 40 having an opening which is rotatable on the front end 42 of the shaft 30. If desired, the aforesaid opening may be provided with a bushing 44 to reduce friction. Desirably, said end 42 is enlarged, as by pinching, to retain the shaft in the frame 22. The upper end of the reach 40 is joined to a horizontal bridging reach 46 which is located above the shaft and frame and spans the space from the front to the rear thereof. The back end of the reach 46 is integral with the upper end of a third vertical reach 48. Said reach 48 is provided with an opening in which the rear end of the shaft 30 is rotatable. As in the case of the intermediate reach 40, the reach 48 may include a bushing 50 to reduce friction between it and the shaft 30. The reach 48 is considerably longer than the reaches 34, 40 and hence depends for a substantial distance below the shaft 30 whereby to act as a pendulum arm.

The lower end of the reach 48 is provided with vertically adjustable means for supporting a permanent magnet 52 which preferably is bar-shaped. Any well-known permanently magnetizable material can be used. By way of example one suitable material is "Alnico V" sold by the Indiana Steel Products Company of Chicago, Illinois, which consists of 8 parts of aluminum, 14 parts of nickel, 24 parts of cobalt, 3 parts of copper and the remander iron. Conveniently, the magnet support constitutes a U-shaped portion 54 of the reach 48 including an upper leg 56, a lower leg 58 and a base 60. The upper and lower legs are apertured in registry to slidably receive the bar magnet 52 which is held in any adjusted position by a set screw 62 threaded through a tapped opening in the base 60. The magnet is considerably heavier than the strip 32, and this plus the substantial distance it is spaced from the shaft 30 causes the position of the center of gravity of the magnet substantially to determine the natural period of oscillation of the pendulum formed by the strip-magnet system.

Carried by the rear wall 28 of the frame in a position immediately and entirely below the permanent magnet is an electromagnet 64 consisting of an actuating coil 66 of wire and a fixed core 68 of magnetizable non-permanently-magnetic material, e. g. soft iron. The magnetic axis of the electromagnet is vertically oriented and is in line with the pendulum at its central position.

A suitable source of portable electric energy as, for example, a dry battery 70 is intended to be employed as the source of power for the motor. The frame 22 includes a battery support consisting of a U-shaped clip 72. The clip is metallic and one arm thereof includes contact means such as an indentation 74 for receiving the top central terminal 76 which is conventionally provided in a dry battery. It may be mentioned here that in accordance with my invention the source of electric energy must be a direct current source and must be properly polarized, and it is to insure such polarization that the terminal-contacting means 74 is designed specially to engage one type of battery terminal, e. g. the top terminal. The other arm of the battery clip has mounted thereon a second battery-engaging contact 78 which is designed to engage the bottom terminal of the battery. The contact 78 may, as shown, simply comprise a headed rivet which would tend to slip off the top terminal of the battery so that anyone employing the motor would understand that the battery is to be inserted in the clip in such a manner that the central top terminal is uppermost. This insures correct polarization of the battery in the motor circuit. The contact 78 is carried by a sleeve 80 of electrically non-conductive material in order to insulate it from the clip. Said clip is physically affixed and electrically connected to the side wall 24 of the frame, the latter being conductive in order to form part of the electric circuit for the motor.

The motor further includes an intermittent circuit making-and-breaking device 82 which comprises a stationary contact 84 and a movable contact 86. The stationary contact is a spring contact made, for example, of phosphor bronze and is in the shape of a U blanked out from sheet metal stock. One leg 88 of the U (see Figs. 3 and 4) is permanently and rigidly attached to a finger 89 integral with and struck inwardly from the side wall 24 of the frame. Electrically non-conductive bushings 90 insulate the stationary contact 84 from the frame. The other leg of the U is provided at its tip with an upwardly extending protuberance 92 whose tip is located directly beneath the shaft 30.

The movable contact 86 comprises a pair of strips 94, 96 located on opposite sides of the shaft 30 and permanently secured to one another in any suitable fashion as, for example, by spot welding adjacent the ends thereof. The centers of the strips are transversely grooved in registry to form a tubular portion 98 in which the shaft 30 is snugly frictionally received thereby permitting the strips 94, 96 to be rotated relative to the shaft but causing them to hold their position unless intentionally angularly displaced.

In its operative position the contact 86 extends in a generally vertical direction.

The lower end of the contact 86 is insulated at both sides thereof in a suitable manner as, for example, by providing a pair of electrically non-conductive panels 100, 102 on the external surfaces of the lower ends of the strips 94, 96, said panels being held in place as by a rivet 104.

The lower ends of the panels 100, 102 are located slightly above the lower ends of the strips 94, 96 whereby the lower end of the contact 86 projects in the clear for a short distance and is thereby available for electrical engagement with the stationary contact 84.

The upper end of the contact 86 extends through an opening 106 in the horizontal bridging reach 46 of the strip 52. The breadth of the opening 106 is less than the arc of rocking normally experienced by said reach so that alternately one side and then the other of the opening will strike the upper end of the movable contact on opposite sides thereof.

In the preferred form of my invention the opening 106 and the fixed and movable contacts are so located and dimensioned that the reach 46 will drive the movable contact into electrical engagement with the stationary contact when the permanent magnet 52 has just passed over its dead-center, i. e. mid-point, position.

A lead wire 108 connects one end of the coil 66 with the bottom terminal contact 78. Another lead wire 110 connects the other terminal of the coil with the stationary contact 84. These constitute all the lead wire connections. However, it will be observed that there is in effect a third lead wire which connects the movable contact 86 with the upper terminal contact 74. Functioning as this third lead wire are the battery clip, the frame, the shaft 30 and the strip 32.

The coil 66 is so wound with respect to the predetermined direction of passage of current therethrough that the upper end of the coil has the same polarity as the lower end of the permanent magnet. The other end of the coil has the same polarity as the remote end of the magnet. Thus, the energized electromagnet and permanent magnet repel one another.

In the operation of the motor the electromagnet 64 normally will be idle and, therefore, will exert no force on the magnet 52. If the magnet is tapped slightly so as to start its swing, the sides of the opening 106 will, as the pendulum swings past mid-point, force the movable contact 86 to and past its dead-center position. In such position the movable contact momentarily will electrically engage the stationary contact 84 thereby causing energization of the coil 66. Such energization will repel the magnet and thrust it in the direction in which it is moving. The continuing movement of the bridging reach 46 will quickly break the electrical engagement of the two contacts thus de-energizing the electromagnet. This action repeats upon reverse movement of the electromagnet as it crosses dead-center position in an opposite direction, and the cycle repeats endlessly as long as the battery is effective.

The foregoing construction has several advantages. For example, momentary energization of very short duration suffices to intermittently energize the electromagnet enough to keep the motor running because energization only is needed during the short period that the permanent magnet crosses over the top of the electromagnet. This results from the fact that said permanent magnet sweeps over the electromagnet instead of being threaded therethrough.

Moreover, because the permanent magnet is not physically captive within the electromagnet the length of the permanent magnet can be adjusted at will with ease thus enabling the period of oscillation of the motor to be varied as desired. By raising the magnet the natural frequency of the pendulum system constituting the strip 32 and the permanent magnet will be increased. Lowering the magnet has the opposite effect. It will be observed that when the magnet is raised the impulse created by electromagnetic repulsion will be lessened thus tending to increase the arc of the pendulum to a lesser extent and thereby minimizing any increase in the natural period of oscillation of the permanent magnet. When the magnetic pendulum is lengthened the electromagnetic impulses become stronger whereby to substantially increase the arc of travel of the pendulum and increase the period of the permanent magnet. Thus, the electromagnetic effect and the effect of varying the length of the pendulum are cumulative and do not tend to nullify one another.

By insulating the two sides of the movable contact the period of electrical engagement between the two contacts is held to the barest minimum thus conserving battery energy. This conservation is aided by the fact that it is only necessary to energize the electromagnet at the time of passage of the permanent magnet across the electromagnet since it is at this moment that the repulsive effect will be the greatest. In addition to reducing battery drain during operation, the insulating side plates 100, 102 permit the motor to be stopped simply by arresting movement of the pendulum manually. This will cause the pendulum to be brought to a halt slightly off its dead-center position at which time one or the other of the insulating plates will physically engage the protuberance 92 and prevent electrical engagement between the lower tips of the electrically conductive strips 94, 96 and the stationary contact 84. Such arrangement obviates the necessity of removing the battery to stop the motor.

Attention is called to the fact that the location of the battery within the hollow structure of the frame in the space necessarily provided for stability of the motor conserves space so that the motor is unusually compact. Moreover, this location of the battery beneath the shaft 30 and alongside the electromagnet as well as close to the bottom of the frame imparts a low center of gravity so that the motor is not easy to overturn accidentally.

If desired, a heavier motor including a larger electromagnet and/or a larger permanent magnet can be driven by a pair of batteries connected in series as shown in the modified form of my invention illustrated in Fig. 7 wherein an additional battery 120 is provided. Said battery is supported by a clip 122 connected, as by rivets, to the frame 22. The lower arm 124 of the clip is provided with a terminal contact 126 in the form of an upwardly convex indentation which is designed to electrically engage the top central terminal of the inverted battery 120. The bottom terminal of the battery is engaged by a contact 128 consisting of a rivet in electrical engagement with the clip 122. Said clip 122 is electrically connected to the clip 72 by a rivet 130 that is used to secure the two clips to the frame. With this arrangement the top central terminal of the battery 70 is electrically connected to the bottom terminal of the battery 120 whereby the batteries are connected in series. The contact 126 is connected by a lead wire 132 to the frame 22 so that the motor will operate in the same manner as the motor 20 above described in detail.

In Figs. 8 through 11 I have shown another motor 140 embodying a modified form of my invention. Said motor includes a U-shaped frame 142 having a shaft 144 journalled in its opposite legs adjacent the top thereof. Said shaft is in electrical contact with the frame and may be mounted in bushings 146 to reduce friction. The forward end 148 of the shaft is upturned to provide means for facilitating engagement between the motor and any element to be driven thereby. The rear end of the shaft is downturned to form a pendulum arm 150 on which a U-shaped bracket 152 is adjustably mounted by means of a set screw 154. The bracket is provided with upper and lower registered openings for accommodating a permanent bar magnet 156 which is juxtaposed to the lower end of the arm 150 whereby when the set screw is tightened said arm will frictionally force the magnet against the sides of the openings in the bracket 152 and thereby retain the magnet in any desired position along the length of the arm.

An electromagnet 158 is mounted on the frame with its fixed core 160 directly beneath the dead-center position of the bar magnet. The electromagnet is adapted to be energized by a dry battery 162 mounted on a clip 164 attached to the frame. Said clip has an indented contact 166 for engaging the top central terminal of the dry battery and a rivet contact 167 for engaging the opposite terminal of the battery. This latter contact is insulated from the clip and is connected to the electromagnet by a lead wire 168. The other end of the electromagnet is connected by a lead wire 170 to the electrically conductive frame 142.

Th shaft 144 has fixed thereto a dependent radial flat contact 172 the tip of which sweeps past and intermittently engages the tip of a stationary erect resilient strip contact 174. This latter contact is mounted on a Z-shaped bar 176 secured to the frame 142. The rivets 178, 180 employed to hold the Z-bar to the frame are insulated from the frame so that the stationary contact is not electrically connected to the frame. However, one of the rivets, e. g. the rivet 180, extends through the frame and electrically engages the battery supporting clip 164 whereby said stationary contact is electrically connected to the upper terminal of the battery 162. The movable contact 172 is electrically connected to the frame as noted above and, therefore, to one end of the electromagnet. Thus, when the two contacts are engaged a circuit is completed for energizing the electromagnet, the windings of which are such that upon energization the upper end of the electromagnet is of the same polarity as the lower end of the bar magnet. The contact 172 is in substantial alignment with the pendulum arm 150; thus as the bar magnet approaches very close to its dead-center position the two contacts will engage to energize the electromagnet. At this moment the permanent magnet has sufficient momentum to continue along its path of travel and cross dead-center position subsequent to which the magnetic repulsive effect will thrust the pendulum magnet toward the opposite side of dead-center position. Immediately after this force is exerted the contacts 172, 174 will separate to de-energize the electromagnet.

It will be appreciated that in this form of the invention too the electromagnet is below the pendulum bar magnet so that all of the advantages inherent in such a system and described with reference to the motor 20 are achieved.

To dampen movement of the spring 174, if desired, a fibrous strip 182 may be provided, said strip having a slit through which the upper end of the contact passes. The strip is bowed and its lower end engages the frame 142 thereby creating the dampening effect.

It thus will be seen that there are provided motors which achieve all the objects of my invention and are well adapted to meet the conditions of practical use.

As various possible embodiments might be made of the above invention and as various changes might be made in the embodiments above set forth, it is to be understood that all matters herein described or shown in the accompanying drawings are to be interpreted as illustrative and not in a limiting sense.

Having thus described my invention, I claim as new and desired to secure by Letters Patent:

1. An electromagnetic oscillating motor comprising a frame, a vertical pendulum arm, means pivotally mounting the upper end of the arm on the frame, a straight elongated permanent magnet, means mounting said magnet on said arm adjacent the lower end thereof with a pole thereof facing downwardly, an electromagnet, means mounting the electromagnet on the frame beneath said pole of the permanent magnet, said electromagnet having a vertically extending straight magnetic axis aligned with said pole of the permanent magnet in its mid-position, a fixed core of magnetizable non-permanently magnetic material constituting an armature for said electromagnet, an electric circuit for so energizing the electromagnet from a direct current source of electric energy that the upper pole of the electromagnet has the same polarity as said pole of the permanent magnet, and switch means including an actuating element carried by and movable with said arm, said switch means being intermittently rendered effective thereby to energize the electromagnet by said circuit means when the permanent magnet is adjacent its mid-position.

2. A motor as set forth in claim 1 wherein the means mounting the permanent magnet permits adjustment thereof axially of the pendulum arm.

3. A motor as set forth in claim 1 wherein the switch means initiates intermittent energization of the electromagnet shortly after the permanent magnet passes mid-position.

4. A motor as set forth in claim 1 wherein the switch means initiates intermittent energization of the electromagnet shortly before the permanent magnet reaches mid-position.

5. An electromagnetic oscillating motor comprising a frame, a permanent magnet, means mounting the magnet on the frame for oscillation relative thereto with a pole of the magnet facing downwardly, an electromagnet, means mounting the electromagnet on the frame beneath said pole of the permanent magnet, said electromagnet having a vertically extending magnetic axis aligned with said pole of the permanent magnet in its mid-position, a fixed core of magnetizable non-permanently magnetic material constituting an armature for said electromagnet, an electric circuit for so energizing the electromagnet from a direct current source of electric energy that the upper pole of the electromagnet has the same polarity as said pole of the permanent magnet, and switch means controlled by movement of said permanent magnet and intermittently rendered effective thereby to energize the electromagnet, said switch means including a fixed contact and a movable contact, means rotatably mounting the movable contact for motion such that the tip of the movable contact intermittently brushes past the stationary contact, and a member movable with said permanent magnet, said member having an opening through which the movable contact extends, said opening being wider than the movable contact whereby as the permanent magnet oscillates first one side of the opening and then the other will actuate the movable contact.

6. A motor as set forth in claim 5 wherein the movable contact is provided on opposite sides thereof with insulating elements which leave the tip of said contact free whereby to limit duration of electrical engagement between the contacts and break the electric circuit when the motor is stopped.

References Cited in the file of this patent

UNITED STATES PATENTS

| | | |
|---|---|---|
| 1,943,046 | Turney | Jan. 9, 1934 |
| 2,093,582 | Uehling | Sept. 21, 1937 |
| 2,428,247 | Scott | Sept. 30, 1947 |
| 2,583,741 | Kiler | Jan. 29, 1952 |
| 2,589,959 | Quick | Mar. 18, 1952 |
| 2,598,954 | Wengel | June 3, 1952 |

FOREIGN PATENTS

| | | |
|---|---|---|
| 232,975 | Great Britain | Aug. 13, 1925 |
| 416,267 | Great Britain | Sept. 13, 1934 |
| 523,399 | France | Apr. 21, 1921 |
| 640,013 | Germany | Dec. 21, 1936 |
| 1,034,804 | France | Apr. 15, 1953 |